Sept. 8, 1936.  L. L. HALLMAN  2,053,476
ARM REST AND INSTRUMENT TABLE
Filed Dec. 28, 1934  2 Sheets-Sheet 1
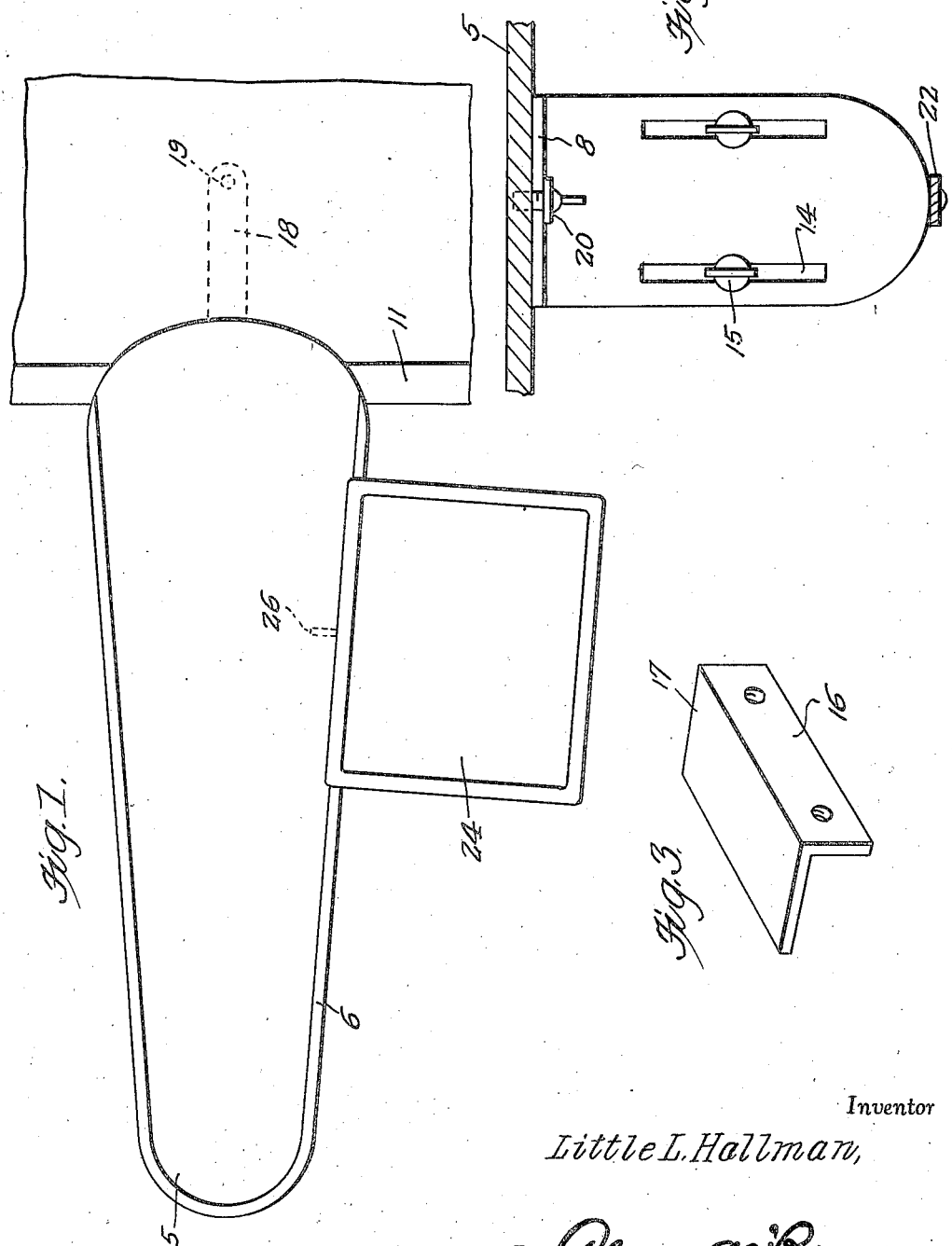
Inventor
Little L. Hallman,
By *Clarence A. O'Brien*
Attorney

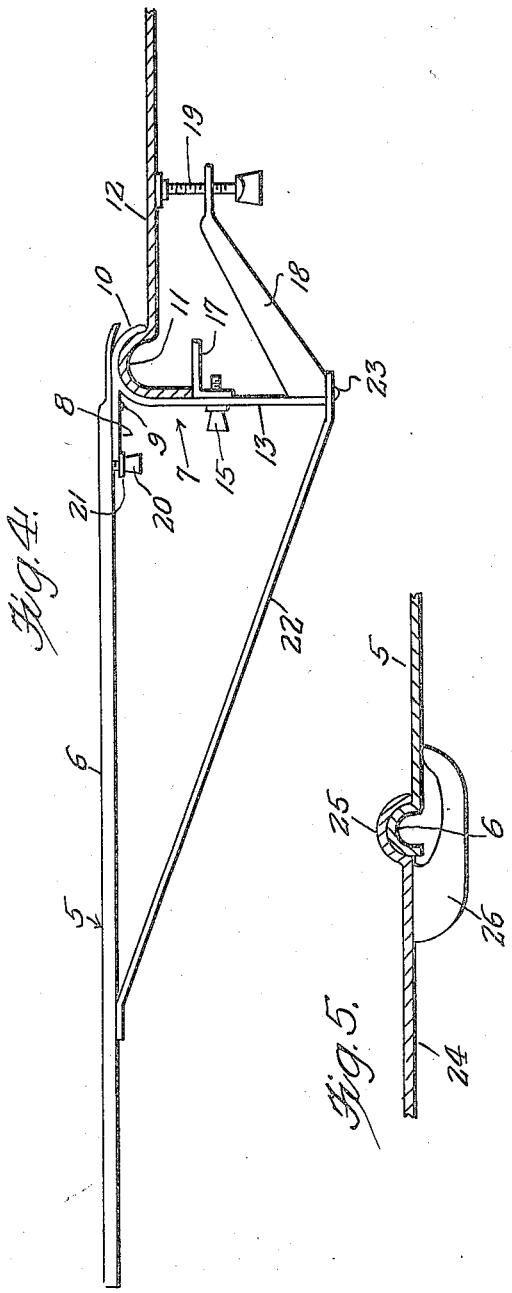

Patented Sept. 8, 1936

2,053,476

UNITED STATES PATENT OFFICE 2,053,476

ARM REST AND INSTRUMENT TABLE

Little Lewie Hallman, Goldsboro, N. C.

Application December 28, 1934, Serial No. 759,572

4 Claims. (Cl. 248—118)

This invention is an arm rest and instrument table adapted especially for use by embalmers, especially those using the right or left axillary arteries for the embalming operation.

An object of the invention is to provide a device of this character characterized by simplicity of structure and economy of parts, and which will serve admirably to support the arm of the corpse out of the way of the embalmer, and for holding the instruments used in the operation in a manner within easy reach of and convenient to the embalmer.

The invention combines an arm rest for supporting the arm of the corpse and a tray detachably connected with the rest for holding the embalming instruments.

The invention together with its objects and advantages will be best understood from a study of the following description taken in connection with the accompanying drawings wherein:

Figure 1 is a top plan view illustrating an application of the invention.

Figure 2 is a transverse sectional view showing the attaching bracket.

Figure 3 is a perspective view of a clamping plate.

Figure 4 is a side elevational view of the arm rest.

Figure 5 is a fragmentary detail sectional view showing the manner of detachably connecting the tray with the arm rest.

Figure 6 is a bottom plan view of the arm rest.

Referring to the drawings by reference numerals it will be seen that the arm rest is indicated by the reference numeral 5. The arm rest 5 may be formed of metal or other suitable material and is of any suitable length and shape. At its marginal edge the arm rest 5 is formed to provide a bead 6.

Pivoted to the larger end of the arm rest 5 at the under side thereof is a bracket 7. The bracket 7 includes an attaching plate portion 8 pivoted to the arm rest 5 as at 9; an integral hook portion 10 adapted to engage over the side bead 11 of an operating table or the like 12 upon which the corpse is laid; and an integral depending body plate 13 provided with slots 14 in which operate binding screws 15. These screws 15 are threadedly engaged with the flange 16 of a substantially L-shaped clamping plate 17 that engages the bead 11 as shown in Figure 4 to cooperate with the part 10 of the bracket to secure the bracket to the edge of the table or the like 12.

Extending from the lower end of the plate 13 at one side thereof is a diagonal brace arm 18 having a flat threaded end with which is engaged a clamping screw 19 that is adapted to be threaded home against the under side of the table or similar support 12 to thereby secure the bracket 13 rigid.

As is apparent the arm rest 5 is adapted to swing relative to the bracket 7 in a horizontal plane, and to secure the arm rest 5 at the desired adjustment there is provided a screw 20 that is threadedly engaged with the arm rest and is formed with a flange or collar 21 to bind against the plate portion 8 of the bracket 7 as shown in Figure 4. Obviously, when the screw 20 is threaded home to engage the collar or flange 21 thereof with the plate 8 of the bracket the arm rest 5 will be secured at the desired adjustment either at right angles to the edge of the table 12 or in a position substantially parallel to the edge of the table.

The arm 5 is braced with respect to the plate 13 of bracket 7 through the medium of a brace member 22 secured at one end to the under side of the arm 5 and pivoted to the bracket 7 as at 23.

For use with the arm 5 there is provided a tray 24 of metal or other suitable material. The tray 24 may be formed of metal or other suitable material and has a rolled edge as at 25 so that at one edge thereof the tray 24 may engage over the bead 6 at one side of the arm 5 as suggested in Figure 5. At said one edge portion the tray 24 on its under side is equipped with a lug 26 that has a free end adapted to bridge the joint between the arm rest 5 and the tray and to engage the under side of the arm rest as also shown in Figure 5 to thereby rigidly support the tray 24 from the arm rest. It will thus be seen that the tray 24 may be used or dispensed with as found desirable, and when used, will provide an admirable means for holding the embalming instruments within convenient reach of the operator who may be working on the arm of the corpse as the arm is supported by the arm rest 5.

The arm rest and tray of this invention will provide a convenient and useful piece of equipment for embalmers, as the arm rest will serve to support the arm of the corpse holding it out of the way of the embalmer, and will also aid in preventing the accidental spilling of liquid onto the floor and clothing, while the tray will serve for holding the instruments and the like in a manner convenient to the embalmer. Also the arm rest will permit the placing of the arm of the corpse in the most desirable position for maximum drainage and injection.

When not in use, the arm rest may be turned in at one side of the table 12 to hold the arm in natural position. It will also be understood that the arm rest may be used on either side of the table or support on which the body lies, for supporting both arms of the corpse. When desired the tray may be easily removed from its support.

Having thus described the invention, what is claimed as new is:

1. In a device of the character described, a bracket having a body plate provided adjacent its upper end with a lateral curved part extending from one side thereof to engage a support, and a second lateral part extending in a reverse direction to the first named lateral part, said body plate having longitudinal spaced slots therein, a clamping plate having adjustable screw bolts therein extending through said slot for slidably adjusting said plate on the bracket with respect to the first named lateral part for clamping the bracket to a support, and an arm rest pivoted to the second named lateral part of the bracket for swinging movement in a horizontal plane.

2. In a device of the character described, a bracket having a body plate provided adjacent its upper end with a lateral curved part extending from one side thereof to engage a support, and a second lateral part extending in a reverse direction to the first named lateral part, said body plate having spaced longitudinal slots therein, a clamping plate having adjustable screw bolts therein extending through said slot for slidably adjusting said plate on the bracket with respect to the first named lateral part for clamping the bracket to a support, an arm rest pivoted to the second named lateral part of the bracket for swinging movement in a horizontal plane, and means carried by the arm rest and engageable with the second named lateral part of the bracket for securing the arm rest at the desired position of adjustment.

3. In a device of the character described, a bracket plate provided at one end with a curved clamping jaw projecting laterally from one side thereof, a clamping plate slidably mounted on the bracket plate at said one side and cooperable with said jaw for securing the bracket plate to a support, means engaging the bracket plate and the clamping plate for securing the latter at the desired adjustment; said bracket plate at said one end having a second lateral part extending in a reverse direction to said jaw, said second lateral part having a curved edge, an arm rest pivoted at one end to the second lateral part and a bolt threadedly engaged with the arm rest at the under side thereof and having a collar cooperable with the arm rest for clamping the edge portion of said second lateral part therebetween to secure the arm rest at the desired angle of adjustment.

4. In a device of the character described, a bracket plate provided at one end with a curved clamping jaw projecting laterally from one side thereof, a clamping plate slidably mounted on the bracket plate at said one side and cooperable with said jaw for securing the bracket plate to a support, means engaging the bracket plate and the clamping plate for securing the latter at the desired adjustment; said bracket plate at said one end having a second lateral part extending in a reverse direction to said jaw, said second lateral part having a curved edge, an arm rest pivoted at one end to the second lateral part and a bolt threadedly engaged with the arm rest at the under side thereof and having a collar cooperable with the arm rest for clamping the edge portion of said second lateral part therebetween to secure the arm rest at the desired angle of adjustment, and said bracket plate at the end thereof remote from said jaw having a brace arm extending laterally therefrom and an adjustment screw threadedly engaged with the arm for engaging the support to brace the bracket plate relative to the support.

LITTLE L. HALLMAN.